(12) United States Patent
Dorn et al.

(10) Patent No.: US 11,135,691 B2
(45) Date of Patent: Oct. 5, 2021

(54) WORKING SPINDLE WITH RADIAL CLAMPING DEVICE

(71) Applicant: GEBR. HELLER MASCHINENFABRIK GMBH, Nürtingen (DE)

(72) Inventors: Thomas Dorn, Reutlingen (DE); Jürgen Walz, Frickenhausen (DE)

(73) Assignee: GEBR. HELLER MASCHINENFABRIK GMBH, Nürtingen (DE)

(*) Notice: Subject to any disclaimer, the term of this patent is extended or adjusted under 35 U.S.C. 154(b) by 0 days.

(21) Appl. No.: 16/624,179

(22) PCT Filed: Jun. 15, 2018

(86) PCT No.: PCT/EP2018/065997
§ 371 (c)(1),
(2) Date: Dec. 18, 2019

(87) PCT Pub. No.: WO2018/234193
PCT Pub. Date: Dec. 27, 2018

(65) Prior Publication Data
US 2020/0130117 A1    Apr. 30, 2020

(30) Foreign Application Priority Data
Jun. 19, 2017 (DE) .................. 10 2017 113 396.8

(51) Int. Cl.
*B23Q 1/70* (2006.01)
*B23Q 5/20* (2006.01)
(Continued)

(52) U.S. Cl.
CPC ............ *B23Q 1/70* (2013.01); *B23B 3/065* (2013.01); *B23Q 3/12* (2013.01); *B23Q 5/04* (2013.01);
(Continued)

(58) Field of Classification Search
CPC ... B23Q 5/20; B23Q 1/28–1/287; B23Q 1/70; Y10T 409/309352; Y10T 29/5112
(Continued)

(56) References Cited

U.S. PATENT DOCUMENTS 2,947,061 A * 8/1960 Carlsen .................... B23Q 1/28
409/62
3,259,020 A * 7/1966 Walker ................... B23Q 1/287
409/231
(Continued)

FOREIGN PATENT DOCUMENTS

CH           674815         7/1990
CN       203170987 U  *    9/2013
(Continued)

OTHER PUBLICATIONS

Machine Translation of EP 2269768 A2, which EP '768 was published Jan. 2011.*
(Continued)

*Primary Examiner* — Erica E Cadugan
(74) *Attorney, Agent, or Firm* — Cantor Colburn LLP

(57) ABSTRACT

The inventive working spindle comprises a spindle housing and a spindle shaft with axial positioning surface and axial contact surface by which the correct axial position of each fitting provided spindle shaft in the spindle housing is obtained. For torque-proof holding of the spindle shaft in the spindle housing, preferably with stationary motor, a braking unit is provided that comprises a radial outer part that is coupled with the spindle housing in a torque-proof manner and a radial inner part that is coupled with the spindle shaft in a torque-proof manner. The largest outer diameter of the peripheral surface of the inner part is smaller than the narrowest location of the through-opening of the spindle housing between the braking unit and the tool side end of the spindle housing. For this reason the spindle shaft can be
(Continued)

readily removed from the spindle housing without disassembly measures of the braking unit, if required, and can be reinserted in reverse route. The inventive working spindle is simply constructed and can be versatilely used. Concurrently it is remarkably easy to maintain.

20 Claims, 3 Drawing Sheets

(51) Int. Cl.
    *B23B 11/00* (2006.01)
    *B23Q 3/12* (2006.01)
    *B23Q 5/04* (2006.01)
    *B23B 3/06* (2006.01)
    *B23Q 1/28* (2006.01)

(52) U.S. Cl.
    CPC ............... *B23Q 5/20* (2013.01); *B23Q 1/287* (2013.01); *B23Q 2705/026* (2013.01); *Y10T 29/5112* (2015.01); *Y10T 409/309352* (2015.01)

(58) Field of Classification Search
    USPC .......................................... 409/231; 29/27 A
    See application file for complete search history.

(56) References Cited

U.S. PATENT DOCUMENTS

| | | | |
|---|---|---|---|
| 4,480,366 A | | 11/1984 | Takahashi et al. |
| 4,570,313 A | * | 2/1986 | Holmstrom .............. B23Q 3/12 29/26 A |
| 4,815,903 A | * | 3/1989 | Skidmore, Sr. .......... B23Q 1/70 409/231 |
| 5,027,682 A | * | 7/1991 | Aiso .................... B23Q 16/102 409/231 |
| 6,073,323 A | | 6/2000 | Matsumoto |
| 6,234,731 B1 | * | 5/2001 | Sakamoto ................ B23Q 5/20 409/144 |
| 7,080,433 B2 | | 7/2006 | Geissler et al. |
| 2004/0226730 A1 | * | 11/2004 | Herla ..................... B23Q 5/048 173/216 |

FOREIGN PATENT DOCUMENTS

| | | | |
|---|---|---|---|
| CN | 106078308 A | * | 11/2016 |
| DE | 69802869 | | 7/2002 |
| DE | 20303147 | | 4/2003 |
| DE | 10257610 | | 6/2004 |
| DE | 102009031027 | | 1/2011 |
| DE | 202011004123 U1 | | 5/2011 |
| DE | 102013017373 | | 4/2015 |
| EP | 0259517 | | 3/1988 |
| EP | 2269768 A2 | | 1/2011 |
| JP | S60228044 | | 11/1985 |
| JP | H0825107 A | | 1/1996 |

OTHER PUBLICATIONS

Machine Translation of EP 259517, which EP '517 was published Mar. 1988.*
Machine Translation of CN 203170987-U, which CN '987 was published Sep. 2013.*
Machine Translation of CN 106078308-A, which CN '308 was published Nov. 2016.*
English Machine Translation of Abstract EP2269768.
English Machine Translation of Abstract JPH0825107.
English Machine Translation of Abstract DE202011004123.
International Search Report for PCT/EP2018/065997.
Written Opinion for PCT/EP2018/065997.
English Machine Translation of Abstract EP0259517.
English Machine Translation of Abstract EP2269768 which corresponds with DE102009031027.
English Machine Translation of Abstract DE102013017373.
English Machine Translation of Abstract DE3913139 which corresponds with CH674815.
English Machine Translation of Abstract JPS60228044.
English Machine Translation of Abstract of DE10257610.
English Translation to German Office Action for Application No. 10 2017 113396.8
German Office Action for Application No. 10 2017 113396.8.
Chinese Office Action for Application No. 201880040582.2; dated Dec. 25, 2020.
English Machine Translation to Chinese Office Action for Application No. 201880040582.2.

* cited by examiner

Working Spindle Wherein the At Least Two Roller Bearings Have Outer Diameters That Are the Same

Fig. 3

WORKING SPINDLE WITH RADIAL CLAMPING DEVICE

CROSS REFERENCE TO RELATED APPLICATIONS

This application is a National Stage of PCT Application No. PCT/EP2018/065997 filed on Jun. 15, 2018, which claims priority to German Patent Application No. 10 2017 113 396.8 filed on Jun. 19, 2017.

BACKGROUND

The invention refers to a working spindle for a machine tool, particularly a machine tool that is configured for carrying out milling operations as well as for carrying out lathe operations.

Machine tools, particularly machining centers, typically comprise one or more working spindles that are configured for receiving tools or tool holders. A working spindle comprises at least one rotatably supported spindle shaft that is connected with a drive device and is rotatably driven therefrom. At its free end the working spindle is configured for receiving said tool or tool holder.

For this DE 20 2011 004 123 U1 discloses a working spindle with a rotatably supported spindle shaft that comprises at its tool side end an exchangeable tool holding fixture for tools or tool holders with hollow shank taper. If it happens that the tool holding fixture wears or is otherwise damaged due to longer use or as a result of frequent tool changes, only the tool holding fixture is exchanged. However, the working spindle itself has not to be disassembled. However, the change of the tool holding fixture does not provide remedy for some types of wear, e.g. wear of the bearing.

The spindle drive of the working spindle serves to drive the working spindle, e.g. with a pre-defined speed. But there are also applications in which the working spindle shall stand still or has to stand still.

BRIEF SUMMARY

Starting therefrom it is the object of the invention to provide a working spindle for a machine tool that is suitable for a rotatable drive as well as for stationary holding of tools and can be maintained easily.

A working spindle for a machine tool, the working spindle having: a spindle housing having a through-opening; a spindle shaft that is arranged in the through-opening of the spindle housing, the spindle shaft having a holding fixture for a tool or a tool holder at one end of the spindle shaft and a coupling for a drive at another end of the spindle shaft; at least two roller bearings that are arranged with an axial distance from each other on the spindle shaft, the at least two roller bearings being located in the spindle housing in order to rotatably support the spindle shaft in the spindle housing; and a braking unit comprising a first part that is connected with a spindle shaft in a torque-proof manner and a second part that is connected with the spindle housing in a torque-proof manner, wherein the first part has a diameter that is smaller than an outer diameter of one of the at least two roller bearings.

The inventive working spindle comprises a spindle housing, also called spindle neck, with a through-opening in which the spindle shaft is rotatably supported. The spindle shaft can be coupled or is connected with a driving device at one end and is provided with a holding fixture for a tool or a tool holder at its other end that is accessible from outside. For the rotatable support of the spindle shaft at least two roller bearings are provided that are arranged with an axial distance from each other on the spindle shaft and in the spindle housing. The roller bearings are preferably assigned to the spindle shaft, i.e. the spindle shaft is removable together with the roller bearings out of the spindle housing for the disassembly. Additionally, the working spindle comprises a break unit that is configured to connect the spindle shaft in a torque-proof manner with the spindle housing. For this the braking unit comprises a part that is connected with the spindle shaft in a torque-proof manner as well as another part that is connected with the spindle housing in a torque-proof manner. The diameter of the part that is connected with the spindle shaft in a torque-proof manner is less than the bearing outer diameter of one of the roller bearings. In doing so, the spindle shaft can be axially pulled out of the spindle housing for maintenance purposes without the need to separate the spindle housing from the machine tool or a drive unit. During the disassembly of the working spindle the part of the braking unit that is connected with the spindle shaft in a torque-proof manner is axially pulled out of the other part of the braking unit that is connected with the spindle housing in a torque-proof manner. The coupling device for connecting the spindle shaft with the drive device is axially not blocked and can be separated by pulling apart axially. The two parts of the braking unit are axially not connected and can be pulled apart axially. Similarly at least one of the two roller bearings in the spindle housing is axially not fixed in the spindle housing, whereas it can be axially connected with the shaft. Thus, the axial position of the spindle shaft is preferably defined by only one of the roller bearings that is axially non-moveably connected with the spindle housing as well as the spindle shaft.

Preferably the working spindle is configured according to the so-called zero-spindle-system. For this the spindle housing comprises an axial positioning surface for the spindle shaft, wherein an axial contact surface is provided at the spindle shaft that is in contact with the axial positioning surface in the mounted condition. The axial positioning surface and the axial contact surface together form an interface at a defined axial position. The axial positioning surface as well as the axial contact surface are axially adjusted on a common reference plane, such that the spindle shaft can be exchanged without a required readjustment.

The through-opening of the spindle housing preferably comprises seating surfaces for at least one tool-proximal roller bearing and for at least one tool-distant roller bearing. The bearing outer diameters of the two roller bearings coincide preferably. However, at least the bearing outer diameter of the tool-distant roller bearing is not larger than that of the tool-proximal roller bearing. In doing so, the unit consisting of the spindle shaft and its roller bearings can be axially pulled out of the spindle housing without the need for disassembly work at the spindle housing. In doing so, the seat of the tool-distant roller bearing in the spindle housing is the narrowest location of its axial passage for the reception of the spindle shaft.

If the braking unit is arranged behind the tool-distant roller bearing with view from the tool holding fixture and if the outer diameter of the part of the braking unit connected with the spindle shaft is smaller or at least as large as the smallest outer diameter of the tool-distant roller bearing, particularly the bearing outer diameter, the spindle shaft can be axially removed out of the spindle housing despite the present break unit, if it is necessary for maintenance reasons.

The braking unit is preferably a hydraulic-actuated braking unit in which a part connected with the spindle housing comprises a friction surface that is arranged radially moveably. In doing so, the movability can be limited to a few fractions of a millimeter, as it can be provided due to the elastic deformability of the part connected with the spindle housing. For example, the part connected with the spindle housing is a ring that is arranged to close the hydraulic chamber radially inward with its peripheral surface. If the hydraulic chamber is put under hydraulic pressure, the friction surface of this ring moves inward as a result of its radial deformation, such that a respective breaking ring of the spindle shaft is clamped.

BRIEF DESCRIPTION OF THE DRAWINGS

Further details of advantageous embodiments of the invention are subject of the description, the drawings or the claims. The drawing show:

FIG. 3 a schematic depiction of a further embodiment.

DETAILED DESCRIPTION

Figure 1:
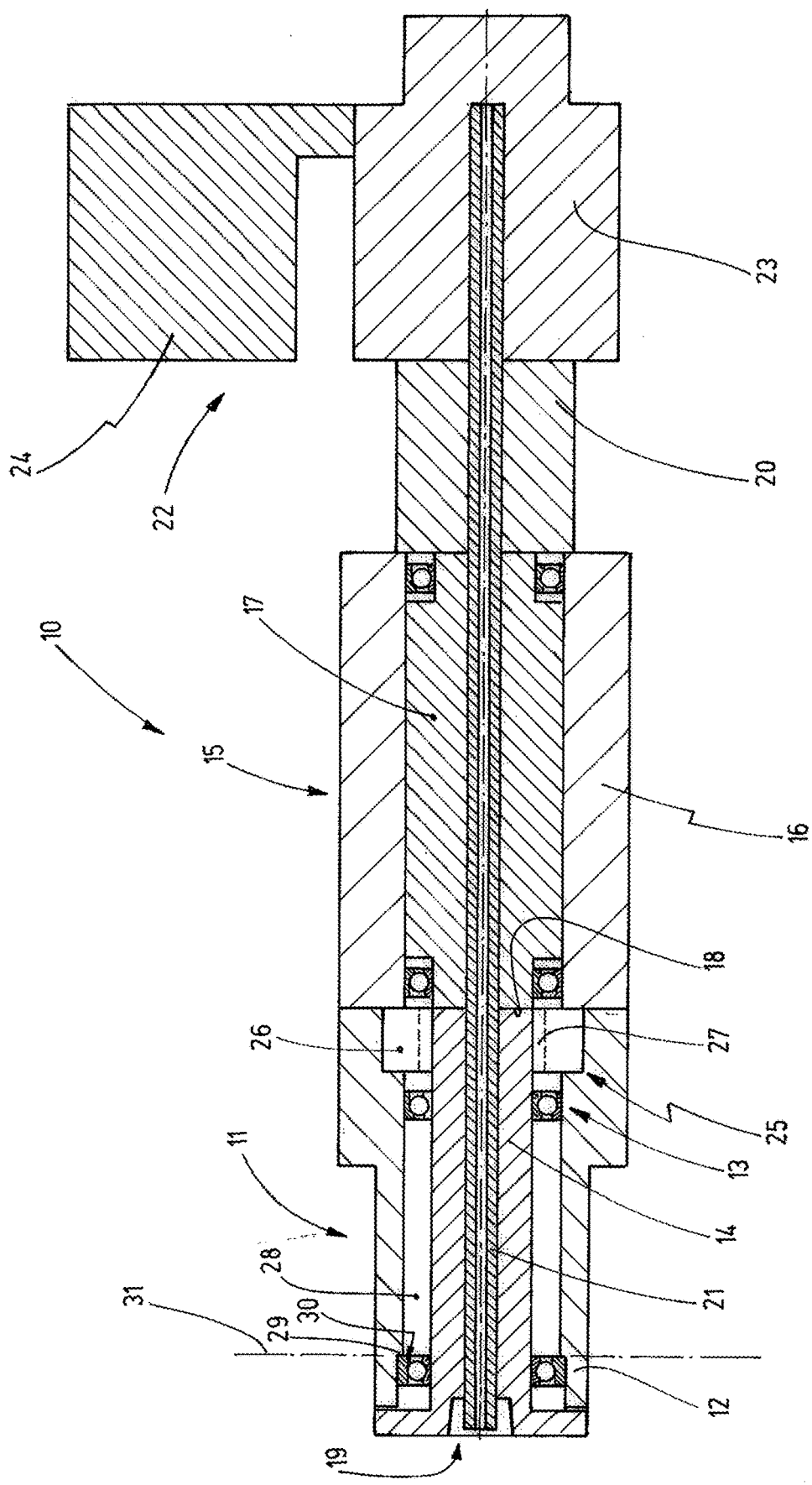
FIG. 1 the inventive working spindle in a schematic block diagram illustration.

In FIG. 1 the working spindle 10 of a machine tool is individually illustrated. The machine tool can be a machining center, a universal machine or the like. Particularly the machine tool is a machine with a moveable workpiece holding fixture. Particularly the machine tool can comprise a workpiece holding fixture for linear and/or rotational movement of a workpiece. For this a rotating table, a pivoting table and/or a linear positioning device can be provided.

The working spindle 10 is preferably designed as individual unit that at least comprises a spindle housing 11 with a spindle shaft 14 supported therein by means of roller bearings 12, 13 and a motor 15. Said motor 15 is connected with the spindle housing 11 or is integrally formed therewith. The motor 15 is an electric motor with a stator 16 and a rotor 17 that is preferably supported in an anti-friction bearing manner and that is arranged concentrically to the spindle shaft 14.

The spindle shaft 14 comprises a coupling device at its end facing the motor 15, as e.g. a face gear or the like via which the spindle shaft 14 is coupled with the rotor 17 in a torque-proof manner that can have a corresponding face gear. The respective coupling device is arranged at the location 18 in FIG. 1, however, not shown in detail.

At the opposite side distant from the motor 15 the spindle shaft 14 comprises said one tool holding fixture 19, e.g. for hollow shank tapers or the like. In the tool holding fixture 19 tools with a suitable shank or tool holders with an according shank can be fixed that in turn hold the tool.

For releasing of tools or tool holders provided in the tool holding fixture a releasing device 20 is provided that is arranged preferably at the side of the motor 15 facing away from the spindle housing 11 and extends through the rotor 17 as well as the spindle shaft 14 with a, e.g. tube-shaped releasing rod. This is not shown in FIG. 1. With its end facing the tool holding fixture 19 the releasing rod is configured to lock and tighten or to release a shank in the tool holding fixture. For this the releasing rod is moved axially.

Additionally, if desired, the working spindle 10 can comprise an adjustment shaft 21 that extends centrally through the spindle shaft 14, the rotor 17 and the release device 20. The adjustment shaft usually rotates synchronously with the spindle shaft 14. However it can be selectively turned by an adjustment unit 22 relative to the stationary or running spindle shaft 14 in order to effect adjustment movements at the tool. Adjustment movements can be, e.g. a change in the radius of a cutting tool. The adjustment unit 22 is preferably arranged beyond the releasing device 20 with view from the motor 15 and comprises an adjustment gear 23 as well as an adjustment motor 24. If the adjustment motor 24 is stationary, the adjustment shaft 21 rotates synchronously with the spindle shaft 14. An operation of the adjustment motor 24 effects a relative rotating movement between the adjustment shaft 21 and the spindle shaft 14.

Between the spindle housing 11 and the spindle shaft 14 a braking unit 25 is effective that is configured to lock the spindle shaft 14 and to inhibit any rotation relative to the spindle housing 11. For this the braking unit 25 comprises a part 26 that is connected with the spindle housing 11 in a torque-proof manner and a part 27 connected with the spindle shaft 14 in a torque-proof manner. The outer diameter of the part 27 is at most as large and preferably smaller than the outer diameter of the roller bearing 13 that is arranged adjacent to the braking unit 25 or in its proximity. The other roller bearing 12 is arranged with an axial distance to the roller bearing 13, preferably in the proximity of the tool holding fixture 19. Both roller bearings 12, 13 support the spindle shaft 14 rotatably in a, e.g. substantially cylindrical through-opening 28 of the spindle housing 11. The smallest diameter of the through-opening 28 is preferably larger than the outer diameter of the second part 27 of the braking unit 25 that is preferably arranged between the roller bearing 13 and the motor 15.

The spindle shaft 14 is axially adjusted with reference to the spindle housing 11. For this the spindle housing 11 comprises an axial positioning surface 29 that is for example formed by means of a step in the through-opening 28. An axial contact surface 30 is assigned to the axial positioning surface 29 that is in abutment with the axial positioning surface 29 in the assembled condition. The axial contact surface 30 can be formed at an outer ring of the roller bearing 12, a part that is in connection with it or at the roller bearing 13 or a part that is in connection with it. The roller bearing 12 is axially fixedly locked on the spindle shaft 14 by suitable means, e.g. in that its inner ring is locked by nuts, retaining rings or other fixing means at the spindle shaft 14.

Due to the assignment of exactly positioned axial positioning surface 29 and axial contact surface 30 in a reference plane 31, the working spindle 10 can be configured as so-called zero-spindle. This means that the spindle shaft 14 can be axially pulled out of the spindle housing 11, preferably while carrying the roller bearings 12, 13 as well as the part 27 of the braking unit 25 and if necessary can also be replaced. Due to the exact determination of the axial position of the axial contact surface 30 at a replacement shaft, it can be inserted in the spindle housing 11 without further adjustment measures, such that the tool holding fixture 19 can be located at the identical same axial position as the spindle shaft 14 that was formerly supported in the spindle housing 11 and was removed in the context of a maintenance process.

Figure 2:
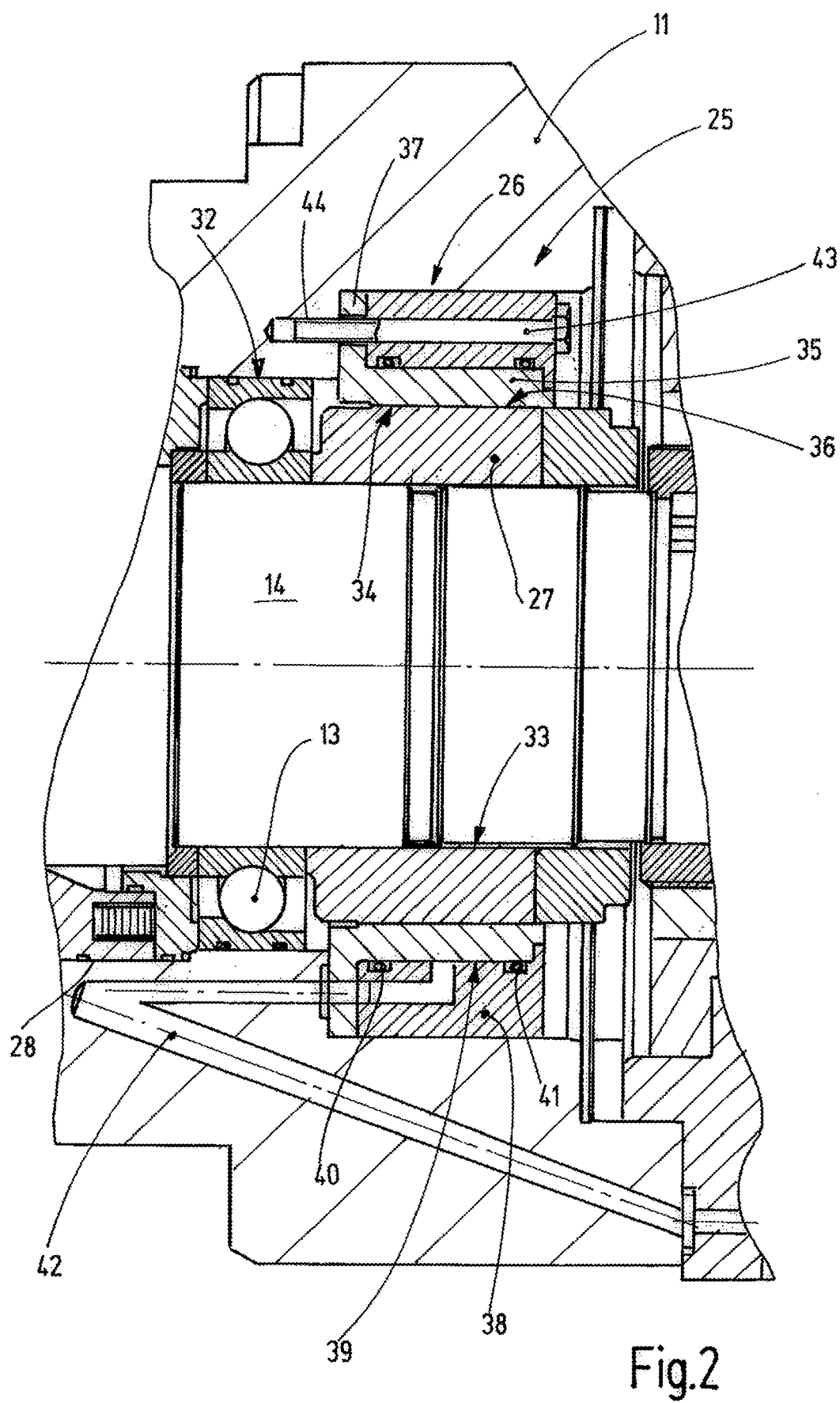
FIG. 2 the working spindle of FIG. 1 in a partly sectional illustration cut in the area of its braking unit.

FIG. 2 illustrates a configuration of the braking unit 25 in detailed form. The illustrated portion of the longitudinal section illustration is thereby limited particularly on that region of the spindle shaft 14 and the spindle housing 11 in which the roller bearing 13 and the braking unit 25 are present. As apparent, the through-opening 28 comprises a cylindrical seating surface 32 as seat for the roller bearing 13 that forms the smallest diameter of the through-opening 28. The outer ring of the roller bearing 13 is held at the seating surface 32. The inner ring of the roller bearing 13 is in contrast seated on a respective cylindrical seating surface of the spindle shaft 14 in direct proximity to the part 27 of the braking unit 25. The part 27 is torque-proof connected with the spindle shaft 14, e.g. by a toothing 33. A peripheral surface 34 of the part 27 is preferably substantially cylindrically configured, wherein the diameter is smaller than the diameter of the seating surface 32.

The part 26 of the braking unit 25 is arranged to surround the peripheral surface 34, wherein it consists of a ring body 35 with a preferably cylindrical friction surface 36. The friction surface 36 is in the initial condition radially slightly distant from the peripheral surface 34, such that an air gap is present of some hundredth or thousandth millimeters. The ring body 35 is torque-proof supported in the spindle housing 11. For this the ring body 35 comprises a ring flange 37 at least at one end, e.g. the end facing the roller bearing 13. Additionally, between the spindle housing 11 and the ring body 35, a ring-shaped body 38 is arranged that defines a ring gap with the ring body 35. Toward both axial ends the ring gap 39 is sealed by means of sealings 40, 41.

A hydraulic fluid can be applied to the ring gap 39. For this a hydraulic channel 42 is provided in the spindle housing 11 that preferably leads through the ring flange 37 and the body 38 to the ring gap 39.

For torque-proof securing of the part 26 and thus the ring body 35 as well as the body 38 at least one and preferably several axially arranged bolts 43 are provided that extend through axial openings of the body 38 and the ring flange 37 and are screwed in respective bores 44 of the spindle housing 11.

During normal operation the hydraulic channel 42 is pressureless. Thus, the friction surface 36 is arranged with distance to the peripheral surface 34 and the part 27 can rotate with low friction or frictionless within the part 26 of the braking unit 25. In this condition a normal rotational operation of the working spindle 10 is allowed. Drilling or milling works or other tasks to be carried out with a rotating tool can be executed with a tool held in the tool holding fixture 19.

As necessary the working spindle 10 can also serve for carrying out lathe works. For this a suitable single or multiple blade tool can be placed in the tool holding fixture 19 and the working spindle 14 can be transferred in the desired rotational position. If it is reached, the braking unit 25 is activated by pressurizing the hydraulic channel 42 with hydraulic fluid that is under pressure. The hydraulic pressure is effective in the ring gap 39 and leads to a slight radially inward deformation of the body 35. This means that the friction surface 36 is moved radially inward and is pressed with a force against the peripheral surface 34 in this direction. The spindle shaft 14 is clamped in a friction-fit manner. The tool held in the tool holding fixture 19 can be brought into engagement with a moved workpiece, e.g. in order to carry out lathe work. Also other work that is carried out with a non-rotating tool, like reaming work, can be carried out by a linear relative movement of the workpiece and the working spindle 10.

The inventive working spindle 10 comprises a spindle housing 11 and a spindle shaft 14 with axial positioning surface 29 and axial contact surface 30 by which the correct axial position of each fitting provided spindle shaft 14 in the spindle housing 11 is obtained. For torque-proof holding of the spindle shaft 14 in the spindle housing 11, preferably with stationary motor 15, a braking unit 25 is provided that comprises a radial outer part 26 that is coupled with the spindle housing 11 in a torque-proof manner and a radial inner part 27 that is coupled with the spindle shaft 14 in a torque-proof manner. The largest outer diameter of the peripheral surface 34 of the inner part 27 is smaller than the narrowest location of the through-opening 28 of the spindle housing between the braking unit 25 and the tool side end of the spindle housing 11. For this reason the spindle shaft 14 can be readily removed from the spindle housing 11 without disassembly measures of the braking unit 25, if required, and can be reinserted in reverse route. The inventive working spindle 10 is simply constructed and can be versatilely used. Concurrently it is remarkably easy to maintain.

REFERENCE SIGNS 10 working spindle
11 spindle housing
12, 13 roller bearing
14 spindle shaft
15 motor
16 stator
17 rotor
18 location
19 tool holding fixture
20 releasing device
21 adjustment shaft
22 adjustment unit
23 adjustment gear
24 adjustment motor
25 braking unit
26, 27 parts of the braking unit 25
28 through-opening of the spindle housing 11
29 axial positioning surface
30 axial contact surface
31 reference plane
32 seating surface
33 toothing
34 peripheral surface
35 ring body
36 friction surface
37 ring flange
38 body
39 ring gap
40, 41 sealings
42 hydraulic channel
43 bolt
44 bores

The invention claimed is:

1. A working spindle for a machine tool, the working spindle having:
   a spindle housing having a through-opening;
   a spindle shaft that is arranged in the through-opening of the spindle housing, the spindle shaft having a tool holding fixture or a tool holder at one end of the spindle shaft and a drive coupled to another end of the spindle shaft;
   at least two roller bearings that are arranged with a distance from each other on the spindle shaft, the at least two roller bearings being located in the spindle housing in order to rotatably support the spindle shaft in the spindle housing; and
   a braking unit located between the drive and the least two roller bearings, the braking unit comprising a first part and a second part, the first part being connected with the spindle shaft in a torque-proof manner and the second part is connected with the spindle housing in a torque-proof manner, wherein the first part has a diameter that is smaller than an outer diameter of one of the at least two roller bearings.

2. The working spindle according to claim 1, wherein the at least two roller bearings have bearing outer diameters that are the same.

3. The working spindle according to claim 2, wherein the first part that is connected with the spindle shaft comprises a cylindrical outer peripheral surface that defines the diameter of the first part.

4. The working spindle according to claim 3, wherein the second part comprises a friction surface that is movably arranged with respect to the first part.

5. The working spindle according to claim 4, wherein the second part) is deformable in a direction in order to bring the friction surface and an outer peripheral surface of the first part into and out of engagement.

6. The working spindle according to claim 5, wherein the second part comprises a ring that is arranged such that a peripheral surface of the ring closes a hydraulic chamber inwardly.

7. The working spindle according to claim 6, wherein the first part and the second part of the braking unit are connected in a torque-proof manner or connectable in a torque-proof manner.

8. The working spindle according to claim 7, wherein the spindle housing) comprises a positioning surface for the spindle shaft.

9. The working spindle according to claim 8, wherein the spindle shaft comprises a roller bearing with a contact surface that is in contact with the positioning surface in an assembled condition of the working spindle.

10. The working spindle according to claim 2, wherein the second part comprises a friction surface that is movably arranged with respect to the first part.

11. The working spindle according to claim 1, wherein the at least two roller bearings have different bearing outer diameters and the diameter of the first part is smaller than the bearing outer diameters of the at least two roller bearings.

12. The working spindle according to claim 11, wherein the first part that is connected with the spindle shaft comprises a cylindrical outer peripheral surface that defines the diameter of the first part.

13. The working spindle according to claim 11, wherein the second part comprises a friction surface that is movably arranged with respect to the first part.

14. The working spindle according to claim 1, wherein the first part that is connected with the spindle shaft comprises a cylindrical outer peripheral surface that defines the diameter of the first part.

15. The working spindle according to claim 1, wherein the second part comprises a friction surface that is movably arranged with respect to the first part.

16. The working spindle according to claim 15, wherein the second part is deformable in a direction in order to bring the friction surface and an outer peripheral surface of the first part into and out of engagement.

17. The working spindle according to claim 1, wherein the second part comprises a ring that is arranged such that a peripheral surface of the ring closes a hydraulic chamber inwardly.

18. The working spindle according to claim 1, wherein the first part and the second part of the braking unit are connected in a torque-proof manner or connectable in a torque-proof manner.

19. The working spindle according to claim 1, wherein the spindle housing comprises a positioning surface for the spindle shaft.

20. The working spindle according to claim 19, wherein the spindle shaft comprises a roller bearing with a contact surface that is in contact with the positioning surface in an assembled condition of the working spindle.

* * * * *